(12) United States Patent
Malisic et al.

(10) Patent No.: US 12,436,855 B2
(45) Date of Patent: Oct. 7, 2025

(54) SYSTEMS AND METHODS UTILIZING DAX MEMORY MANAGEMENT FOR TESTING CXL PROTOCOL ENABLED DEVICES

(71) Applicant: ADVANTEST CORPORATION, Tokyo (JP)

(72) Inventors: Srdjan Malisic, San Jose, CA (US); Chi Yuan, San Jose, CA (US)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 18/129,422

(22) Filed: Mar. 31, 2023

(65) Prior Publication Data

US 2024/0095138 A1    Mar. 21, 2024

Related U.S. Application Data

(60) Provisional application No. 63/439,460, filed on Jan. 17, 2023, provisional application No. 63/439,470, (Continued)

(51) Int. Cl.
*G06F 11/00* (2006.01)
*G06F 11/22* (2006.01)
(Continued)

(52) U.S. Cl.
CPC ........ *G06F 11/263* (2013.01); *G06F 11/2205* (2013.01); *G06F 11/2273* (2013.01); (Continued)

(58) Field of Classification Search
CPC .............. G06F 11/273; G06F 11/2733; G06F 11/2273; G06F 11/2205
See application file for complete search history.

(56) References Cited

U.S. PATENT DOCUMENTS 9,684,687 B1   6/2017  Infineon
9,952,276 B2   4/2018  Frediani
(Continued)

FOREIGN PATENT DOCUMENTS

CN   105428773    3/2019
CN   110596567    12/2019
(Continued)

OTHER PUBLICATIONS

No author, daxctl(1), 2019, NDCTL (docs.pmem.io) (Year: 2019).*
(Continued)

*Primary Examiner* — Marc Duncan

(57) ABSTRACT

Efficient and effective testing systems and methods are presented. In one embodiment, a test system includes: a user interface configured to enable user interaction with the system; a test board configured to communicatively couple with a plurality of devices under test (DUTs), wherein the DUTs are compute express link (CXL) protocol compliant; and a tester configured to direct testing of the plurality of DUTs, wherein the tester includes a direct access device (DAX) interface that prevents corruption of DUTs. In one exemplary implementation, the tester isolates testing of a particular CXL enabled DUT from undesirable interference and corruption. The tester can prevent inappropriate writing over the DUT's memory. The DUTs reside in the separate per-device space of a Linux operating system rather than an extension of memory space. One of the plurality of DUTs can be a CXL type 3 memory expander device. In one exemplary implementation, the direct access device (DAX) interface creates a unique DAX instance for each individual DUT included in the plurality of DUTs

18 Claims, 13 Drawing Sheets

Related U.S. Application Data filed on Jan. 17, 2023, provisional application No. 63/439,434, filed on Jan. 17, 2023, provisional application No. 63/439,464, filed on Jan. 17, 2023, provisional application No. 63/408,801, filed on Sep. 21, 2022, provisional application No. 63/408,795, filed on Sep. 21, 2022, provisional application No. 63/408,788, filed on Sep. 21, 2022, provisional application No. 63/408,809, filed on Sep. 21, 2022.

(51) Int. Cl.
  *G06F 11/263* (2006.01)
  *G06F 11/27* (2006.01)
  *G06F 11/273* (2006.01)
  *G06F 21/53* (2013.01)

(52) U.S. Cl.
  CPC .......... *G06F 11/27* (2013.01); *G06F 11/2733* (2013.01); *G06F 21/53* (2013.01); *G06F 2221/034* (2013.01)

(56) References Cited

U.S. PATENT DOCUMENTS

| | | | |
|---|---|---|---|
| 10,084,224 B2 | 9/2018 | Skyworks | |
| 11,403,449 B1 | 8/2022 | Saxena | |
| 2003/0078679 A1 | 4/2003 | Sutton | |
| 2003/0120974 A1 | 6/2003 | Adams | |
| 2012/0079259 A1 | 3/2012 | Swanson et al. | |
| 2015/0028908 A1 | 1/2015 | Kushnick | |
| 2015/0234768 A1 | 8/2015 | Bass | |
| 2015/0309847 A1 | 10/2015 | Aggrawal | |
| 2016/0179734 A1 | 6/2016 | Shih | |
| 2017/0063425 A1 | 3/2017 | Us | |
| 2017/0109315 A1 | 4/2017 | Safranek | |
| 2018/0313889 A1* | 11/2018 | Su | G01R 31/2806 |
| 2019/0179750 A1 | 6/2019 | Moyer | |
| 2019/0230012 A1 | 7/2019 | Azizullah | |
| 2021/0011706 A1 | 1/2021 | Nachimuthu | |
| 2021/0303430 A1* | 9/2021 | Yuan | G06F 13/1668 |
| 2022/0034967 A1 | 2/2022 | Strickling | |
| 2022/0155342 A1 | 5/2022 | Chow | |
| 2022/0179788 A1 | 6/2022 | Brewer | |
| 2022/0187361 A1 | 6/2022 | Kabbani | |
| 2022/0190936 A1 | 6/2022 | Jin | |
| 2022/0197833 A1* | 6/2022 | Steinmetz | G06F 13/1668 |
| 2022/0318111 A1 | 10/2022 | Choudhary | |
| 2023/0129200 A1 | 4/2023 | Carrieri | |
| 2023/0134661 A1 | 5/2023 | Ma | |
| 2024/0095135 A1* | 3/2024 | Malisic | G06F 11/27 |
| 2024/0095136 A1* | 3/2024 | Malisic | G06F 11/2205 |
| 2024/0095137 A1* | 3/2024 | Malisic | G06F 11/27 |
| 2024/0248633 A1* | 7/2024 | Guim Bernat | G06F 3/0683 |

FOREIGN PATENT DOCUMENTS

| | | |
|---|---|---|
| CN | 114218030 | 3/2022 |
| CN | 114637713 | 6/2022 |
| CN | 109314298 | 5/2023 |
| KR | 2020-0077387 | 6/2020 |
| KR | 2021-0122197 | 10/2021 |
| KR | 2022-0097248 | 7/2022 |
| KR | 2022-0097269 | 7/2022 |
| TW | I221202 | 9/2004 |
| TW | 200828336 | 7/2008 |
| TW | 202105376 | 2/2012 |
| TW | I623763 | 5/2018 |
| TW | 201837490 | 10/2018 |
| TW | 202132793 | 9/2021 |
| TW | 202219970 | 5/2022 |
| TW | I773395 | 8/2022 |

OTHER PUBLICATIONS

Ahn, Minseon et al., Enabling CXL Memory Expansion for In-Memory Database Management Systems, Jun. 13, 2022, ACM (Year: 2022).*
"Advantest Enables PCIe Gen 5 NVMe & CXL Device Testing on Proven MPT3000 SSD Test System", Jul. 27, 2022, TestandMeasurement.com (Year 2022).
CXL Compute Express Link Specification, Jun. 2019, Revision 1.1 (Year 2019).
Rob Dobson, "Validating CXL Memory Device Functionality and Performance with Teledyne LeCroy", Jan. 29, 2024, Teledyne LeCroy, White Paper (Year 2024).
No Author, daxct(1), 2019, NDCTL (docs.pmem.io) (Year 2019).
Ahn; et al. Enabling CXL Memory Expansion for In-Memory Database Management Systems; Jun. 13, 2022; 5 pages; Philadelphia, PA USA.

* cited by examiner

200

210
Directing testing of a devices under test (DUT), wherein the testing includes compute express link (CXL) protocol communication with the DUT.

220
Preventing testing operations of the DUTS from detrimentally interfering with one another.

410
Receiving an indication associated with hot addition of a device under test (DUT), wherein the testing includes compute express link (CXL) protocol communication with the DUT and the DUT is included in a plurality of devices under test (DUTs).

420
Initiating a testing suspension process, wherein the testing suspension process suspends testing of the plurality of DUTs, and wherein the testing suspension process is automatically performed in response to the receiving of the indication associated with the hot addition of the DUT.

430
Receiving an indication to resume testing after hot add of the DUT to the test system.

440
Ending the testing suspension process, wherein ending the testing suspension process is automatically performed in response to the receiving of the indication to resume testing.

450
Resuming testing of the plurality of DUTs.

┌─────────────────────────────────────────────────────────────┐
│ 610                                                         │
│ Performing a persistent device representation process for a compute │
│ express link (CXL) protocol compliant device under test (DUT). │
└─────────────────────────────────────────────────────────────┘
                              │
┌─────────────────────────────────────────────────────────────┐
│ 620                                                         │
│ Performing a device power up clean up process.              │
└─────────────────────────────────────────────────────────────┘
                              │
┌─────────────────────────────────────────────────────────────┐
│ 630                                                         │
│ Performing a device power down clean up process.            │
└─────────────────────────────────────────────────────────────┘

810
Directing testing of a devices under test (DUT), wherein the testing includes compute express link (CXL) protocol communication with the DUT, wherein the DUT is included in a plurality of DUTs.

820
Preventing testing operations of the plurality of DUTs from detrimentally interfering with one another.

FIG. 8

SYSTEMS AND METHODS UTILIZING DAX MEMORY MANAGEMENT FOR TESTING CXL PROTOCOL ENABLED DEVICES

RELATED APPLICATIONS

This application claims the benefit of and priority to provisional applications
63/408,788, entitled CXL PROTOCOL ENABLEMENT FOR TEST ENVIRONMENT SYSTEMS and METHODS filed Sep. 21, 2022,
63/439,460, entitled CXL PROTOCOL ENABLEMENT FOR TEST ENVIRONMENT SYSTEMS and METHODS filed Jan. 17, 2022,
63/408,795, entitled MANAGEMENT OF HOT ADD IN A TESTING ENVIRONMENT FOR DUTS THAT ARE CXL PROTOCOL ENABLED filed Sep. 21, 2022,
63/439,434, entitled MANAGEMENT OF HOT ADD IN A TESTING ENVIRONMENT FOR DUTS THAT ARE CXL PROTOCOL ENABLED filed Jan. 17, 2022,
63/408,801, entitled SYSTEMS AND METHODS UTILIZING DAX MEMORY MANAGEMENT FOR TESTING CXL PROTOCOL ENABLED DEIVCES filed Sep. 21, 2022,
63/439,470, entitled SYSTEMS AND METHODS UTILIZING DAX MEMORY MANAGEMENT FOR TESTING CXL PROTOCOL ENABLED DEIVCES filed Jan. 17, 2022,
63/408,809, entitled SYSTEMS AND METHODS FOR TESTING CXL ENABLED DEVICES IN PARALLEL filed Sep. 21, 2022, and
63/439,464, entitled SYSTEMS AND METHODS FOR TESTING CXL ENABLED DEVICES IN PARALLEL filed Jan. 17, 2022,
which are all incorporated herein by reference.

FIELD OF INVENTION

Systems and methods configured to provide testing capability for devices under test (DUTs) that are compute express link (CXL) protocol compliant.

BACKGROUND

Compute Express Link (CXL) is a new communication (e.g., bus, etc.) protocol to the electronic device industry (e.g., memories, etc.) and as such there are many challenges that needed to be solved for the CXL protocol to be used in a testing environment on CXL enabled DUTs. In particular, during normal non-test operation CXL devices are often used to provide shared storage resources for system memory. Prior art Automatic Test Equipment (ATE) did not efficiently and effectively address these issues (e.g., CXL system memory, etc.) and traditional test systems and methods provided very little or no testing capabilities associated with testing CXL compliant Devices Under Test (DUTs).

The basic normal purpose of a CXL type 3 device is to function as additional shared main system memory resources and this characteristic can make testing the device particularly problematic. Without the invention, the memory space of a CXL DUT can be considered a shared part of the tester host system memory space. As a shared part of system memory, a CXL DUT would be accessible by different entities (e.g., devices, applications, processes, threads, etc.) coupled in the system. In the shared system memory mode or "kernel memory" mode one device coupled to the test system can typically write to, and thereby corrupt, the memory space of another device. Such a result in a testing environment can cause interference with testing operations and produce unreliable test results.

Furthermore, there are several highly desirable testing system characteristics that are often considered a necessity for proper testing. However, traditional testing systems and methods typically could not provide these capabilities as a practical matter. For example, it is very desirable and often necessary for test systems and methods to be able to hot add/swap DUTs and test multiple DUTs in parallel. The shared access aspects of the CXL DUTs make it very difficult for a system to properly test multiple DUTs in parallel without interfering with testing of other DUTs. In addition, there are versions of CXL that do not currently have the ability to conveniently add/swap CXL devices to a system. Version 1.1 of the CXL protocol does not allow for hot adding/swapping of devices while they are operating because device enumeration is only performed through the BIOS (which requires a system reboot). When a device boots for the first time, BIOS initializes it and enables it as CXL device. This effectively prevents devices from being hot added (e.g., during testing, etc.), since a reboot is required to recognize the new device by the host. In order to add/swap a CXL device, the whole system traditionally must be shut down, the new CXL device is added/swapped, and then the system is restarted with testing of the DUTs starting over from the beginning. This prior art condition of starting over again costs/wastes lots of time and resources expended on testing of the other DUTs in the system (e.g., including loss of control data, etc.).

The CXL protocol is currently primarily designed for normal computer use of devices, not for testing, and especially not for testing multiple CXL devices in parallel, and many challenges traditionally needed to be solved to allow efficient and effective testing.

SUMMARY

Efficient and effective testing systems and methods are presented. In one embodiment, a test system includes: a user interface configured to enable user interaction with the system; a test board configured to communicatively couple with a plurality of devices under test (DUTs), wherein the DUTs are compute express link (CXL) protocol compliant; and a tester configured to direct testing of the plurality of DUTs, wherein the tester includes a direct access device (DAX) interface that prevents corruption of DUTs. In one exemplary implementation, the tester isolates testing of a particular CXL enabled DUT from undesirable interference and corruption. The tester can prevent inappropriate writing over the DUT's memory. The DUTs reside in the separate per-device space of a Linux operating system rather than an extension of memory space. One of the plurality of DUTs can be a CXL type 3 memory expander device. In one exemplary implementation, the direct access device (DAX) interface creates a unique DAX instance for each individual DUT included in the plurality of DUTs.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

FIG. 2 is a block diagram of an exemplary testing method in accordance with one embodiment.

FIG. 4 is a block diagram of an exemplary device hot add testing method in accordance with one embodiment.

FIG. 6 is a block diagram of an exemplary device testing management method in accordance with one embodiment.

FIG. 8 is a block diagram of an exemplary parallel testing method in accordance with one embodiment.

DETAILED DESCRIPTION

Figure 1A:
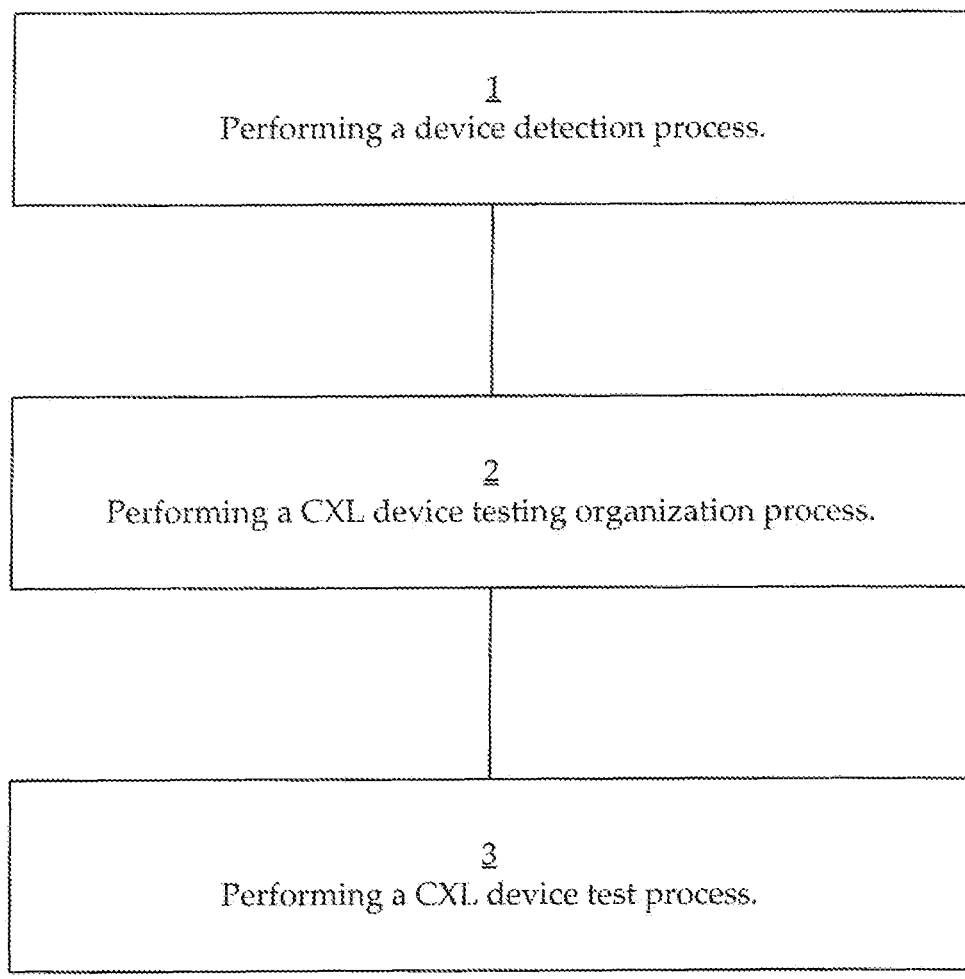
FIG. 1A is a block diagram of an exemplary test system in accordance with one embodiment.

Reference will now be made to various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The accompanying drawings, which are incorporated in and form a part of this specification, are included for exemplary illustration of the principles of the present invention and are not intended to limit the present invention to the particular implementations illustrated therein. The drawings are not to scale unless otherwise specifically indicated.

The figures are not necessarily drawn to scale, and only portions of the devices and structures depicted, as well as the various layers that form those structures, are shown. For simplicity of discussion and illustration, only one or two devices or structures may be described, although in actuality more than one or two devices or structures may be present or formed. Also, while certain elements, components, and layers are discussed, embodiments according to the invention are not limited to those elements, components, and layers. For example, there may be other elements, components, layers, and the like in addition to those discussed.

Presented novel systems and methods provide efficient and effective testing of CXL compliant devices. In one embodiment, the systems and methods provide convenient testing capabilities that address new and rapidly expanding demand associated with the technological paradigm shift to CXL protocol compliant memory DUTs. In one embodiment, the systems and methods enable efficient and cost saving testing of CXL protocol enabled DUTs. In one exemplary implementation, the systems and methods cover devices using new CXL protocol features on DUTs under testing conditions.

It is appreciated there are many different novel aspects and approaches in the presented systems and methods for resolving problematic issues associated with testing of CXL protocol compatible devices. In one embodiment, the presented systems and methods enable efficient and effective implementation of CXL related activities during DUT testing. In one exemplary implementation, the presented systems and methods include hardware and software improvements.

In one embodiment, systems and methods cover aspects of creating and managing an environment required to implement testing of DUTs that utilize the CXL protocol. It is appreciated that CXL DUTs can include various types of devices. In one embodiment, the CXL DUTs can include various types of memory (e.g., DRAM, persistent memory, etc.) that are often used to provide storage resources for system memory under normal non-test operation. In one exemplary implementation, a DUT is typically allocated/assigned to a separate memory range within the system memory space during normal operation.

FIG. 1A is a block diagram of an exemplary test method 10 in accordance with one embodiment.

In block 1, a device detection process is performed. In one embodiment, the detection process includes determining if the device is a CXL device, and if it is a CXL device what are the characteristics/features of the CXL device and what portion/addresses of a host CPU memory the CXL device is assigned/allocated to. The device detection process can include enumeration. In one embodiment, a device detection process requires a reboot to fully determine the device is a CXL device and complete/finish the enumeration. In one exemplary implementation, the device detection process is performed by a Basic Input/Output System (BIOS).

In block 2, a CXL device testing organization process is performed. The CXL device testing organization process organizes and configures the test system to perform testing of the CXL device. In one embodiment, a CXL device testing organization process includes isolating a CXL device from detrimental interference from other components. In one exemplary implementation, the device testing organization process includes preventing other components from accessing portions of a memory range assigned/allocated to a CXL device (e.g., assigned/allocated in block 1 above). In one embodiment, a device testing organization process includes retrieving the device detection process information and establishing a CXL testing reference or name for the CXL device based upon a test board coupling location (e.g., DUT slot, etc.). In one exemplary implementation, the reference or name is consistent or persistent while the application/thread process that created/instantiated it is running. In one exemplary implementation the device testing organization process includes a device mapping process that maps the CXL device to a test board coupling location indicator (e.g., DUT slot identifier, etc.). In one exemplary implementation, user test specification requirements are mapped to hardware available from the host CPU instruction set. The portions of a memory range assigned to a CXL device can correspond to the name/identifier.

In block 3, a CXL device test process is performed/directed. In one embodiment, testing workloads (e.g., data patterns, instructions, etc.) are generated. The generation can include translating from the user indicated functionality to the appropriate CXL device commands that achieve the user desired functionality. In one embodiment, the test process is a functional performance test (e.g., bandwidth, latency, error, etc.). In one embodiment, directing a CXL device test process includes generating test workloads. In one embodiment, the systems and methods do not let detrimental test system characteristics/features (e.g., Host CPU optimization, etc.) to inadvertently/unintentionally corrupt testing operations. In one embodiment, multiple independent parallel test processes are performed on a plurality of CXL DUTs.

In one embodiment, translating from the user indicated functionality to the appropriate CXL device commands includes generating an appropriate number of read commands and write commands in accordance with user indicated preference. In one exemplary implementation, a user indicates a desired 50% reads and 50% writes. However, the system actually also utilizes a read operation in response to a write command from the host. Thus, the present systems and methods automatically generates the appropriate workload directions for a correct ratio of actual reads and writes (e.g., ⅔ or 66% reads and ⅔ or 33% writes, etc.) to get the user requested ratio (e.g., 50% read and 50% write, etc.).

In one embodiment, device testing organization process hot add/swap features are included in a CXL device testing organization process.

In one embodiment, the device testing organization process includes flushing operations. In one exemplary implementation, memory locations associated with the isolation and mapping operations in block 2 are flushed when a corresponding CXL DUT is removed from the tester system. The flush operations can include flush corresponding cache entries. In one embodiment, systems and methods assures the sequence of commands that go to the CXL DUT are appropriate and prevent a host CPU from issuing replacement commands (e.g., as part of an optimization process, etc.) if the replacement commands would otherwise detrimentally impact test results/accuracy.

It is understood that in this description a CXL device is usually a device under test DUT. In one embodiment, a test system host CPU memory storage capacity can be extended by a CXL device without the CXL device being a DUT, wherein the CXL device acts as a memory extension for the host.

In one embodiment, the systems and method include APIs. In one exemplary implementation, the systems and methods include three groups of APIs. The first group of APIs provides facilities that automatically assist a user in powering up/down a CXL DUT in the test system. The second group of APIs automatically handles management and conversion of user test requirements and control descriptions into appropriate CPU instruction set commands and CXL device directions/instructions. The third group of APIs includes debugging controls. In one exemplary implementation, the APIs can communicate with the user through a convenient intuitive user GUI.

Figure 1B:
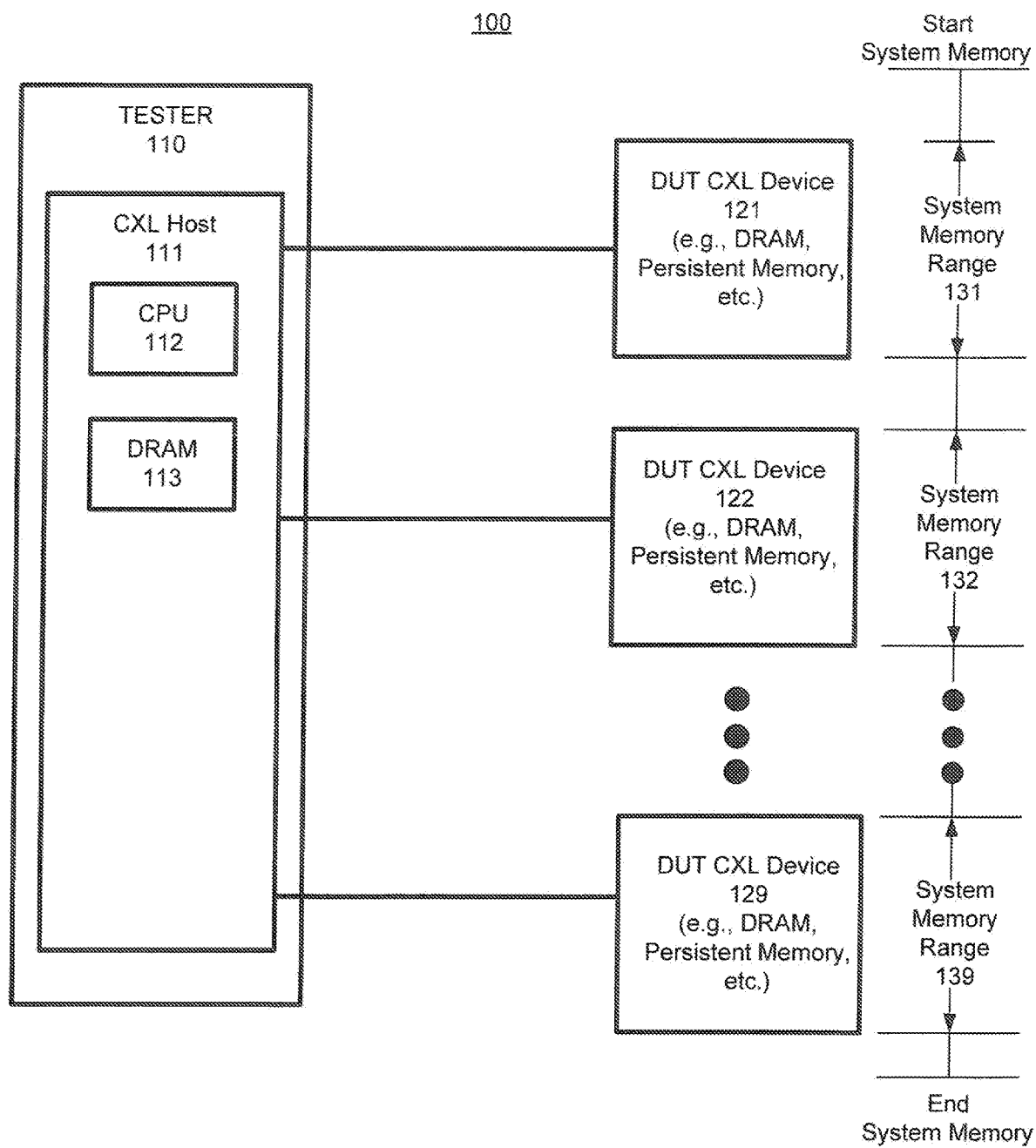
FIG. 1B is a block diagram of an exemplary test system in accordance with one embodiment.

FIG. 1B is a block diagram of an exemplary test system 100 in accordance with one embodiment. Test system 100 includes tester 110 and CXL DUTs 121, 122, . . . , 129, which are CXL compliant. Tester 110 includes CXL host 111, which includes a processor (e.g., CPU 112, etc.) and memory (e.g., DRAM 113, etc.). In FIG. 1 CXL DUT 121 is assigned to system memory range 131, CXL DUT 122 is assigned to system memory range 132, and CXL DUT 129 is assigned to system memory range 139. This aspect of the CXL protocol can be particularly problematic during testing as a CXL DUT can be considered part of the host (e.g., tester CPU, etc.) memory space. For example, without the presented novel systems and methods, a CXL DUT would be accessible by different entities (e.g., applications, threads, processes, etc.) causing interference (e.g., data improperly overridden, consistency issues, etc.) with testing operations and likely producing unreliable test results. In one exemplary implementation, presented testing systems and methods prevent interference (e.g., data improperly overwritten by different entities, incorrect read operations, etc.).

In one embodiment, the presented novel systems and methods provide coordination and management of testing access to the different memory resources of the CXL DUTs. It is appreciated there are various approaches to coordinating and managing the CXL testing (e.g., DAX interfaces, tracking DUT assigned memory ranges, etc.). In one exemplary implementation, the presented systems and methods prevent undesirable interference with testing of a particular DUT. The presented novel systems and methods can also be utilized to address/solve many other issues associated with testing CXL DUTs. In one device testing mode embodiment, the systems and methods efficiently and effectively address issues with the following aspects of the a CXL protocol enabled DUT environment: payload generation, device enumeration, enabling hot add/swap of devices, unique test environment constraints associated with the CXL protocol, and others.

FIG. 2 is a block diagram of an exemplary testing method 200 in accordance with one embodiment.

In block 210, a process of directing testing of a device under test (DUT) is performed, wherein the testing includes CXL protocol communication with the DUT. In one embodiment, directing testing includes determining if a particular one of the DUTs is a CXL compliant device. Determining if a particular one of the DUTs is a CXL compliant device can be performed as part of an enumeration process. In one exemplary implementation, basic input/output system (BIOS) operations determine if the particular one of the DUTs is a CXL compliant device. Directing testing can include determining characteristics of the DUTs.

In block 220, testing operations of the DUTs are prevented from detrimentally interfering with one another. In one embodiment, preventing testing operations of the DUTs from detrimentally interfering with one another include assigning separate memory ranges to the DUTs. In one exemplary implementation, user configuration requirements are mapped to characteristics of the DUTs. In one exemplary implementation cache accesses are tracked and coordinated in accordance with user requirements.

Managed Hot Add/Swap

Presented systems and methods provide user friendly efficient and effective managed hot add/swap capability for DUTs that are CXL protocol compliant (AKA CXL device), wherein the add/swap of a particular DUT does not interfere with testing of other DUTs. The presented systems and methods also allow HOT add/swap of CXL protocol enabled devices during testing without any loss of control data. In one embodiment, systems and methods include modifications required to allow CXL enabled DUTs to be hot added or swapped out without interfering with other DUT testing operations and done in such a way as to be transparent to the technician performing the test procedures. There are many reasons why a device may need to be swapped out during a test. For example, a DUT can be removed and a different DUT can be inserted (e.g., for binning purposes, upon failure, etc.) enabling increases in overall testing efficiency. In one embodiment, the systems and methods allow a CXL DUT to be hot added/swapped out of the tester system without stopping (or otherwise interfering with) the testing operations of other CXL DUT devices. In one exemplary implementation, the addition/swap of a CXL DUT device is performed with no loss of pertinent control data. In accordance with one embodiment, during testing of multiple CXL enabled DUTs in parallel by a host device tester, a new DUT can be added (e.g., a "hot add", etc.) and the new DUT will be automatically recognized by the host in a way that is largely transparent to test technicians.

In one embodiment, a test technician interfaces with a graphical user interface (GUI) implemented on the host tester computer system. In one embodiment, upon a need/desire for a hot add, the user/technician utilizes the GUI to temporarily trigger a testing pause, then the new DUT is installed by the technician, and testing re-start is triggered by the technician interfacing with the GUI again. The technician only has to implement an easy pause of testing for a particular DUT and an easy start trigger (e.g., push GUI button/icon, etc.), the systems and methods conveniently and automatically direct the other complicated aspects of a hot add/swap.

Figure 3:
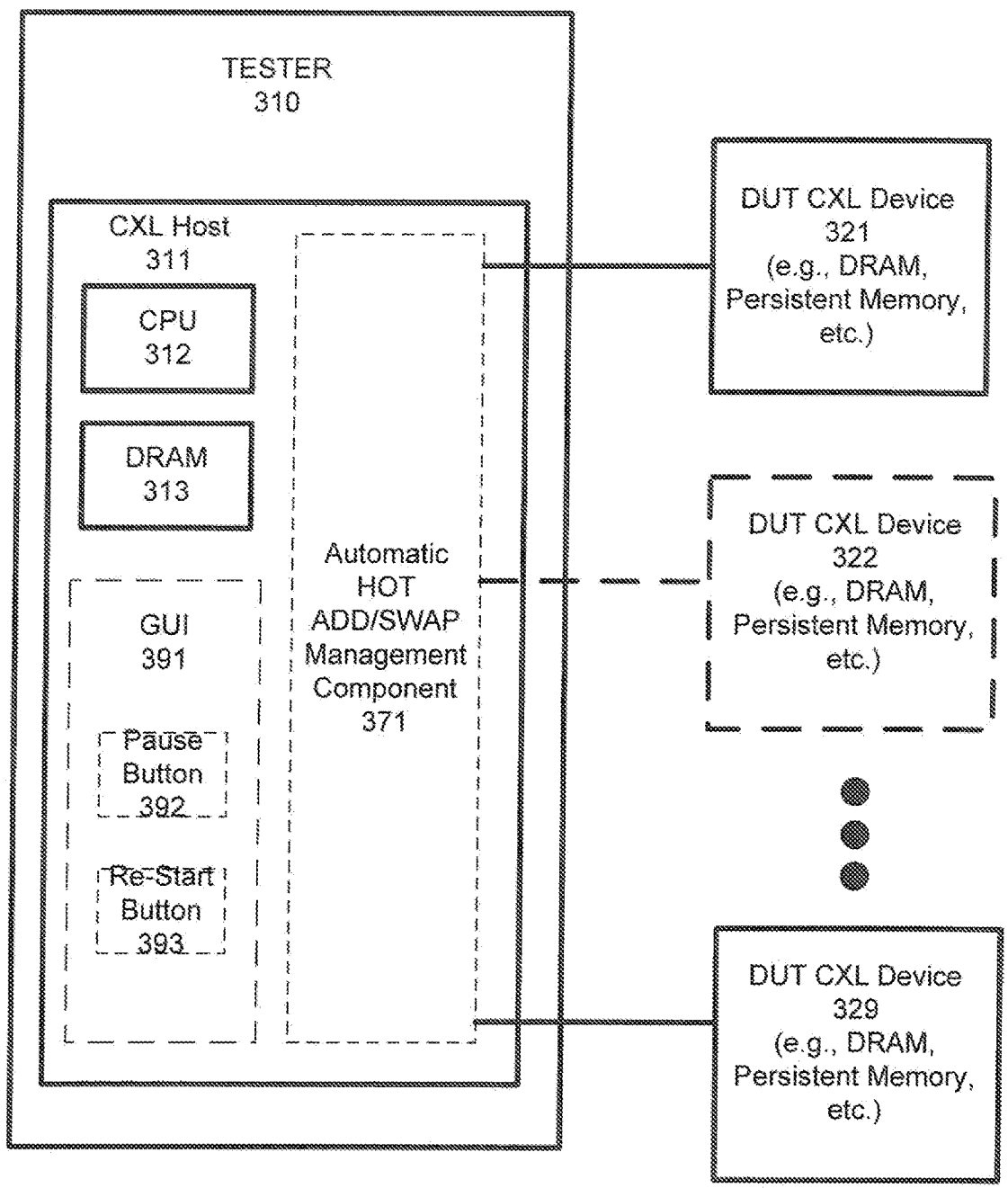
FIG. 3 is a block diagram of a hot add test system in accordance with one embodiment.

FIG. 3 is a block diagram of a hot add test system 300 in accordance with one embodiment. Test system 300 includes tester 310 and DUTs 321, 322, and DUT 329. which are CXL compliant. Tester 310 includes CXL host 311, which includes a processor (e.g., CPU 312, etc.) and memory (e.g., DRAM 313, etc.). Tester 310 also includes automatic hot add/swap management component 371 which is used to direct host adds/swaps of DUTs. Tester 310 can also be utilized to direct implementation of GUI 391 which includes pause button 392 and restart button 393. In the FIG. 3, a CXL device (e.g., 322, etc.) in the test board DUT 2 position/slot is hot added by the technician hitting the pause GUI button for DUT 2 testing, inserting the new CXL device in the test boards DUT 2 position, and hitting the re-start GUI button.

The system automatically performs several operations (e.g., mounting, enumeration, etc.) that are transparent to the user, including storing the current set of testing data associated with all DUTs, then rebooting the entire system (e.g., so that the newly added DUT can be enumerated by BIOS, etc.), and commencing communication between the DUTs (e.g., including the newly added DUT, etc.) and the host. Test data synchronization then also automatically occurs transparently. After resetting and booting up, testing continues. In one exemplary implementation, the reset and other initialization steps implemented to enable the managed hot add are automatically performed transparently to the technician by the presented novel systems and methods. The GUI (e.g., see FIG. 1, etc.) displays convenient on-screen instructions to "walk"/guide the technician through the few manual steps that are required to perform the hot add. In one embodiment, the technician triggers a pause by hitting a button/icon on the GUI. The technician can also similarly use the GUI to notify the system of that a new DUT has been inserted and resume testing. In one exemplary implementation, no test control data is lost when performing the managed hot add and the details required to implement the hot add are advantageously hidden from the technician and automatically performed by the presented novel systems and methods.

Also, there are additional aspects of the systems and methods related to other improvements in the graphical user interface GUI, including for test flow, test program, and so on. In one exemplary implementation, a switch between a first and second flow can be conveniently triggered by simple interaction with the GUI and the system automatically performs other operations associated with implementing the switch (e.g., automatically directs preservation of appropriate data from the first flow, etc.).

In one embodiment, the systems and methods can quickly and efficiently address the technological paradigm shift to CXL protocol compliant DUTs and responding to customer demand for HOT ADD/SWAP testing capabilities directed to new CXL enabled DUTs.

FIG. 4 is a block diagram of an exemplary device hot add testing method 400 in accordance with one embodiment. In block 410, an indication associated with hot addition of a device under test (DUT) is received, wherein the testing includes compute express link (CXL) protocol communication with the DUT and the DUT is included in a plurality of devices under test (DUTs).

In block 420, initiating a testing suspension process, wherein the testing suspension process suspends testing of the plurality of DUTs, wherein the testing suspension process is automatically performed in response to the receiving of the indication associated with the hot addition of the DUT. Initiating a testing suspension process can include communication between the plurality of DUTs and the host. In one embodiment, initiating a testing suspension process includes storing the current set of testing data associated with the plurality of DUTs.

In block 430, an indication to resume testing is received after hot add of the DUT to the test system.

In block 440, ending the testing suspension process, wherein ending the testing suspension process is automatically performed in response to the receiving of the indication to resume testing. In one embodiment, ending the testing suspension process includes retrieving the set of testing data associated with the plurality of DUTs that was stored in block 420. In one embodiment, ending the testing suspension process includes test data synchronization, resetting, and rebooting the system to allow continued testing. In one exemplary implementation, operations associated the testing suspension process, including mounting and enumeration (e.g., ending of the test suspension process includes BIOS enumeration operations, etc.), are transparent to the user.

In block 450, testing of the plurality of DUTs is resumed.

In one embodiment, the hot addition of the DUT is associated with a hot swap with another DUT, wherein the other DUT is removed from the test system.

DAX

Presented novel systems and methods provide DAX management and testing isolation capabilities for individual DUTs that are CXL protocol compliant. In one embodiment, the systems and methods are directed to novel testing operation management techniques of Linux DAX (Direct Access Device) related features. The management between a host tester and several DUTs under parallel test by the host tester, where the DUTs are CXL enabled, enables efficient and effective testing of the CXL DUTs. The CXL DUTs can include various types of memory (e.g., DRAM, persistent memory, non-persistent memory, etc.). Rather than sharing the CXL DUT's memory within the system memory space of the tester system, the memory testing management technique advantageously provides protections to prevent memory corruption between DUTs.

It is appreciated that there are a lot of different novel aspects of leveraging DAX capabilities to resolve problematic issues associated with the new CXL protocol. In one embodiment, presented systems and methods are directed to isolating testing of a particular CXL enabled DUT from undesirable interference and corruption (e.g., inappropriate writing over the DUT's memory, etc.). In one exemplary implementation, presented systems and methods are also directed to other aspects of CXL device testing (e.g., workload generation for parallel operation, etc.). It is appreciated that presented systems and methods can focus on various aspects of testing (e.g., testing on an individual DUT basis, managing/coordinating parallel testing on a plurality/system of DUTs basis, etc.).

Figure 5:
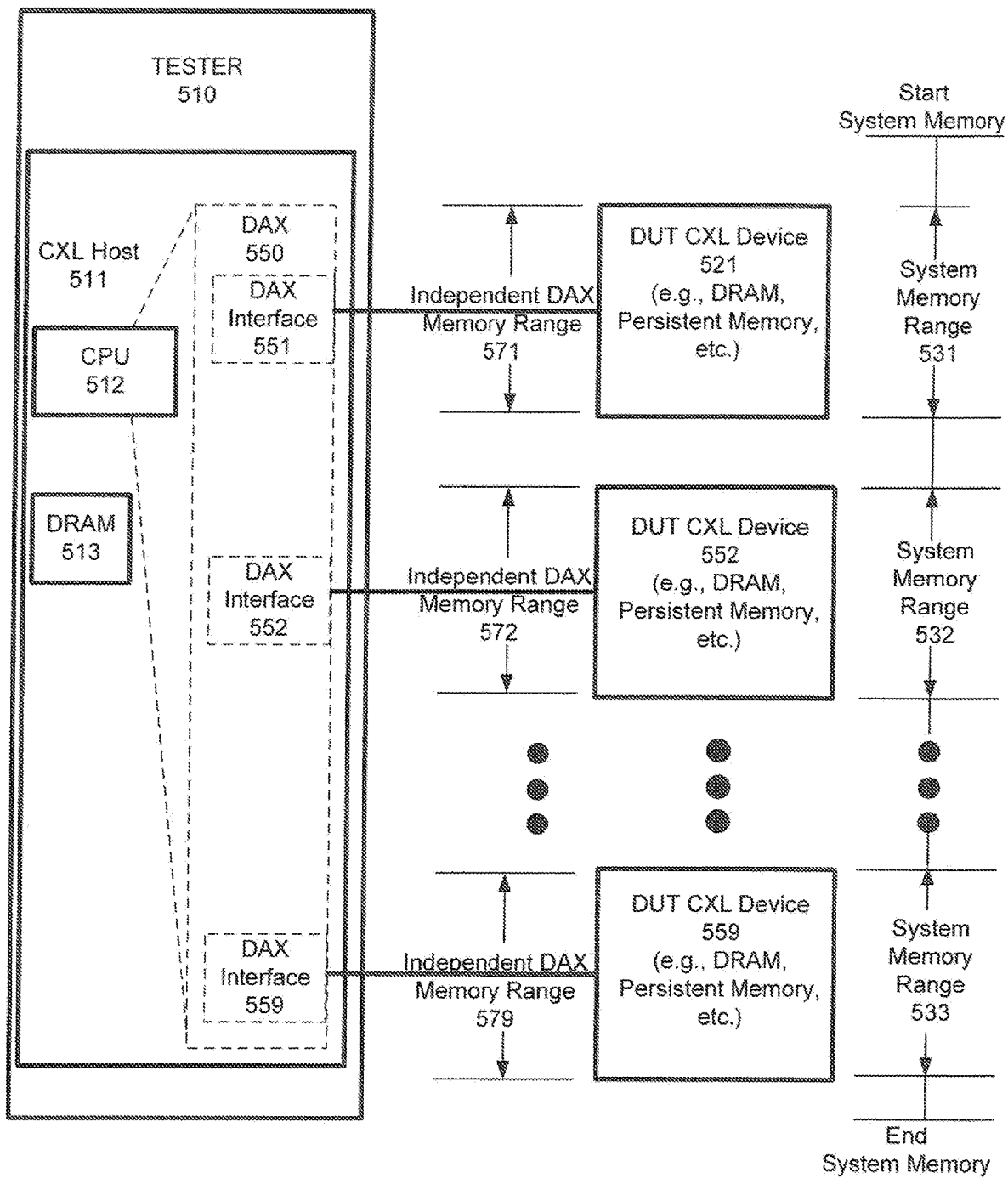
FIG. 5 is a block diagram of an exemplary test system in accordance with one embodiment.

During normal operation in one embodiment, each DUT is allocated/assigned to a separate memory range within the system memory space. FIG. 5 is a block diagram of an exemplary test system 500 in accordance with one embodiment. Test system 500 includes tester 510 and DUTs 521, 522, and DUT 529. which are CXL compliant. Tester 510 includes CXL host 511, which includes a processor (e.g., CPU 512, etc.) and memory (e.g., DRAM 513, etc.). In one embodiment, CPU 512 directs operations of DAX component 550 which includes DAX interface 551, DAX interface 552, and DAX interface 559. Dax interface 551 manages interactions with independent DAX memory range 571 assigned to DUT 521. Dax interface 552 manages interactions with independent DAX memory range 572 assigned to DUT 522. Dax interface 550 manages interactions with independent DAX memory range 579 assigned to DUT 529. In one exemplary implementation, CXL DUT 521 is assigned to system memory range 531, CXL DUT 522 is assigned to system memory range 532, and CXL DUT 129 is assigned to system memory range 539.

Without the presented systems and methods, during testing a CXL enabled DUT can be considered part of the tester host system shared memory space causing interference with testing operations and likely produce unreliable test results. However, utilization/leveraging of a DAX interface in this presented novel testing environment enables the presented test systems and methods to overcome the prior art testing problems/issues.

In one embodiment, DAX is a memory management interface technique in which a host (e.g., tester host, etc.) runs Linux and the CXL devices (e.g., DUTs, etc.) reside in the separate per-"device space" of the Linux operating system. Thus, the memory resources of the CXL DUT are not merely an extension of the system memory of the host tester, but rather are considered to reside in the device space memory. One advantage of using DAX for DUT memory management is that DAX allows the host to communicate with and task each device separately. This closes off the DUT's memory from external corruption caused by some other device on the system (e.g., writing over the DUT's memory, etc.). Thus, DUT memory is protected and no other device can write to the otherwise "shared" memory portion of the DUT while the DUTs are managed using DAX memory interface.

In other words, the DAX interface advantageously prevents other connected devices from writing to and corrupting the memory space of a connected DUT. Another advantage of a DAX memory interface is that troubleshooting and debug are made much easier by directly managing mapping between physical and virtual addresses, and optionally making virtual addresses equal physical addresses. Also, the DAX memory interface prevents a higher-level system crash when DUT memory is bad (e.g., corruption that causes an automatic crash, etc.), because the DUT memory is not directly mapped to OS system memory. The presented systems and methods allow devices that would otherwise be part of a shared system memory to be considered separated and tested separately.

In addition, utilizing the DAX interface also reduces potential of other testing delays/crashes associated with memory allocation. The presented systems and methods efficiently and effectively provide convenient CXL device testing capabilities that respond to rapidly expanding demand for testing capabilities directed to the technological paradigm shift to new CXL enabled DUTs. The presented systems and methods do this in a manner that avoids/minimizes development and production costs that would otherwise be associated with complicated management/coordination features necessary to implement testing of CXL compliant DUTs.

FIG. 6 is a block diagram of an exemplary device testing management method 600 in accordance with one embodiment.

In block 610, a location-based persistent device representation process is performed for a compute express link (CXL) protocol compliant device under test (DUT). In one embodiment, performing a persistent device representation process includes assigning and tracking the CXL compliant DUT, including characteristics of the CXL compliant DUT, based upon a reference indicator that is unique to the CXL compliant DUT, wherein the reference indicator is persistent while the CXL compliant DUT is communicatively coupled to the test board. The test board location-based name ensures tester is able to target the CXL compliant DUT and is persistent while the CXL compliant DUT is communicatively coupled to the load board. In one exemplary implementation, the reference indicator is based upon a test board location slot utilized to communicatively couple the CXL compliant DUT. The persistent device representation includes naming the DUT, wherein the name is created automatically on of LINUX enumeration.

In block 620, a device power up cleanup process is performed. In one embodiment, the power up process includes wait for a BIOS enumeration process without scanning device.

In block 630, a device power down cleanup process is performed. In one embodiment, the power down process includes flushing process for a central processing unit (CPU) and cache included in a host in a tester. In one exemplary implementation, the flushing includes flushing data in addresses that were written to in operations associated with testing of the CXL compliant DUT, wherein the addresses are included to a range mapped to the CXL compliant DUT. Parallel The presented novel systems and methods provide Systems and Methods for Testing CXL Enabled Devices in Parallel (AKA Multi-Device Management). The presented novel systems and methods provide and coordinate/manage complex independent workload generation and parallel testing capabilities for a plurality/system of DUTs that are CXL protocol compliant. The CXL protocol is a new protocol and as such there are many new challenges that needed to be solved for CXL protocol to be used in a testing environment. The prior art did not efficiently and effectively address these issues. In particular, during normal non-test operation CXL compliant devices are often used to provide shared storage resources for system memory. This can be particularly problematic when attempting to test multiple CXL DUTs in parallel. Without the invention, a CXL enabled DUT's memory space can be considered a shared part of the tester host system memory space and coordinating testing of multiple CXL DUTs in parallel and managing respective workloads independently is typically problematic, may lead to memory corruption, and likely to produce unreliable test results.

The presented novel systems and methods are directed to providing convenient testing capabilities for the new and rapidly expanding demands associated with technological paradigm shift to CXL protocol compliant DUTs. The presented novel systems and methods are directed to efficient and cost saving capabilities for testing multiple CXL enabled devices in parallel. Further, several different memory spaces of a same CXL enabled device can be tested in parallel.

The presented novel systems and methods are directed to techniques developed to establish and increase independent parallel testing across a plurality/system of DUTs where the DUTs are CXL protocol enabled. In one embodiment, multiple CXL DUTs are tested in parallel by a host tester system and workloads are independently generated and managed for the multiple CXL DUTs being tested in parallel. Moreover, different memory spaces of a same DUT can also be tested in parallel. In one embodiment, the presented novel systems and methods provide maximum flexibility for testing DUTs in parallel and push testing of the DUT to its limit regarding this flexibility. The flexible and independent parallel testing features provide fast and economical CXL DUT testing capabilities.

It is appreciated that there are a lot different problematic issues associated with the new CXL protocol. The presented novel systems and methods are directed to managing/coordinating parallel testing on a plurality/system of DUTs with independent workloads being applied to the DUTs and within a same DUT. The presented novel systems and methods can also be directed to other aspects of CXL device testing (e.g., isolating a particular individual CXL DUT from memory over write, etc.). It is appreciated that presented systems and methods can focus on various aspects of testing (e.g., testing on an individual DUT basis, managing/coordinating parallel testing on a plurality/system of DUTs basis, etc.).

Figure 7:
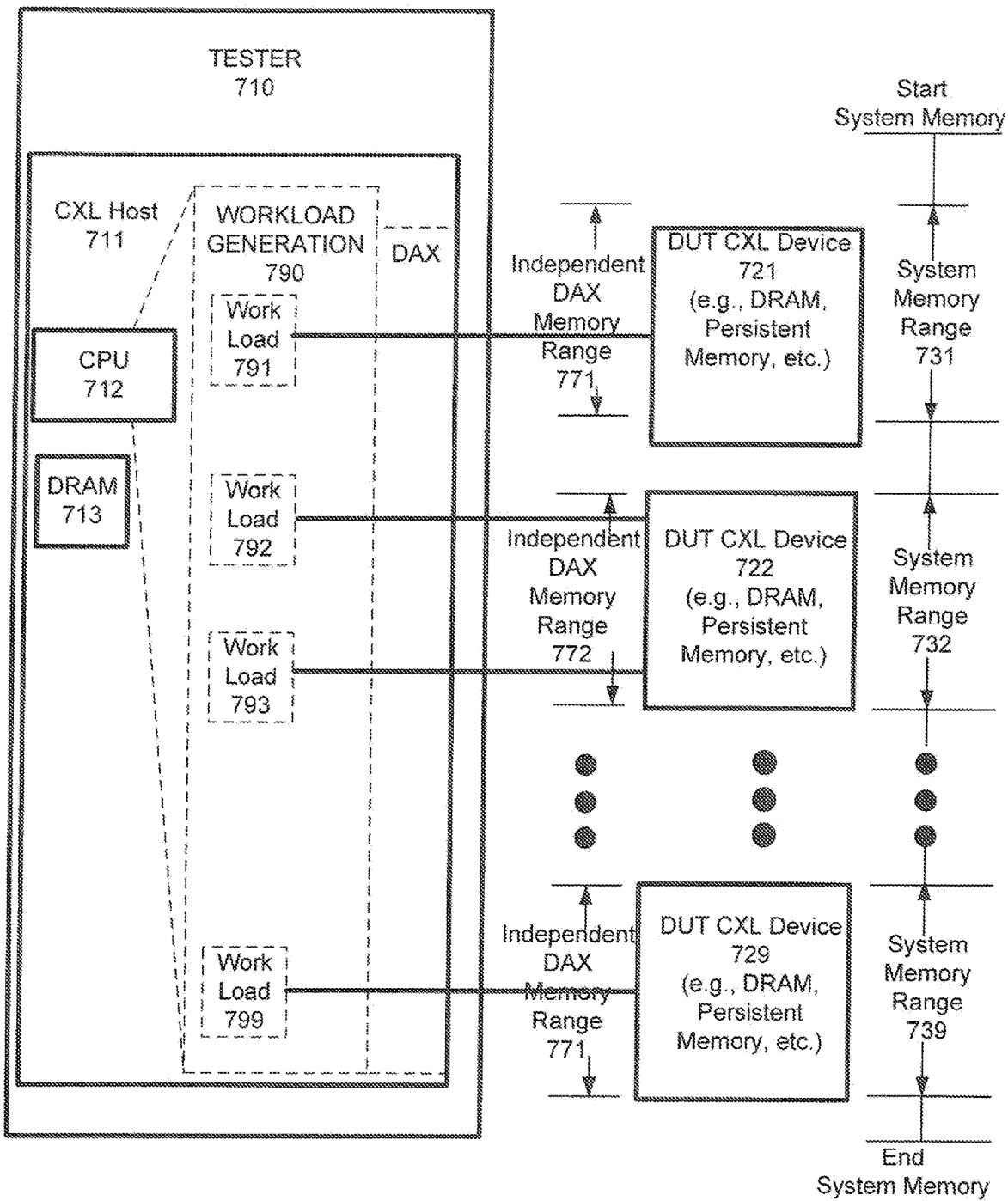
FIG. 7 is a block diagram of an exemplary test system in accordance with one embodiment.

FIG. 7 is a block diagram of an exemplary test system 700 in accordance with one embodiment. Test system 700 includes tester 710 and DUTs 721, 722, and DUT 729. which are CXL compliant. Tester 710 includes CXL host 711, which includes a processor (e.g., CPU 712, etc.) and memory (e.g., DRAM 713, etc.). In one embodiment, CPU 712 directs operations of workload generation component 790 and DAX component 750. Workload generation component 790 generates workload instructions and includes workload interfaces 791, 792, and 791. Workload interface 791 manages workload testing of DUT 721. Workload interface 792 and workload interface 793 manages workload testing of DUT 722. In one embodiment, workload interface 792 manages workload for a first portion of memory in DUT 722 and workload interface 793 manages workload for a second portion of memory in DUT 722. Workload interface 799 manages workload testing of DUT 729. In one exemplary implementation, CXL DUT 721 is assigned to system memory range 731, CXL DUT 722 is assigned to system memory range 732, and CXL DUT 129 is assigned to system memory range 739.

In one embodiment, a workload defines how a tester is going to test the CXL DUTs. In one exemplary implementation, multiple workloads defining different parameters (e.g., memory range, percentage read/writes, percentage randomness, the number of loads and store, etc.) can be independently and separately assigned to CXL enabled DUTs being tested in parallel by a same host tester system. In one exemplary implementation, multiple host threads can be established in parallel (e.g., executing on the testing host) and each thread can operate on a particular memory range of different DUTs or on a same DUT. It is appreciated the memory ranges can be implemented in various configurations (e.g., the memory ranges can be on different DUTs, different ranges of a single DUT, etc.). This allows for maximum flexibility in establishing test ranges and independent workloads for testing the CXL DUTs.

In one embodiment, a DAX interface is utilized to manage the communicative coupling of multiple CXL enabled DUTs to the test system. In one exemplary implementation, the memory resources of the CXL DUT are not merely a "shared" extension of the system memory of the host tester, but rather are considered to reside "separately" in the device space instantiation. These configuration features can facilitate efficient and effective CXL DUT testing in parallel with independent workloads. In one exemplary implementation, many CXL DUTs (e.g., 8, 18, etc.) can be coupled to a single host tester system.

It is appreciated the presented systems and methods can be leveraged/modified for use in various parallel and independent testing configuration scenarios. In one embodiment, different workloads can be applied to different DUTs in parallel or different instances of a same workload can be applied to different DUTs in parallel. In one embodiment, multiple workloads can be assigned to a single DUT in parallel with each workload operating on a different range of DUT memory. Multiple instances of a similar workload definition can be utilized in parallel (e.g., to test a plurality of CXL DUTs, etc.). The DUTs can include various types of memory (e.g., DRAM, persistent memory, etc.).

Regarding increases in parallelism, workloads can be created and assigned to devices separately and in parallel across many CXL DUTs, which allows a high degree of flexibility for parallel separate/independent testing. Another advantage is that many tests can be queued up in parallel since each CXL DUT can be separately assigned a respective workload.

The presented systems and methods can address the demand for testing capabilities directed to new CXL enabled DUTs. The flexible and independent parallel testing features of the presented systems and methods provide the opportunity to address/satisfy user requests/desires for efficient and effective testing resources in terms of both performance and cost.

FIG. 8 is a block diagram of an exemplary parallel testing method 800 in accordance with one embodiment.

In block 810, directing parallel testing of a devices under test (DUT), wherein the testing includes compute express link (CXL) protocol communication with the DUT, wherein the DUT is included in a plurality of DUTs. The DUT is one of a plurality of DUTs and directing testing of the DUT includes managing testing workloads independently. The testing is performed on a system level rather than component level testing.

In block 820, testing operations of the plurality of DUTs are prevented from detrimentally interfering with one another. In one embodiment, the testing includes performance testing. In one exemplary implementation, the testing is performed in accordance with user directed percentage of reads and writes.

Figure 9:
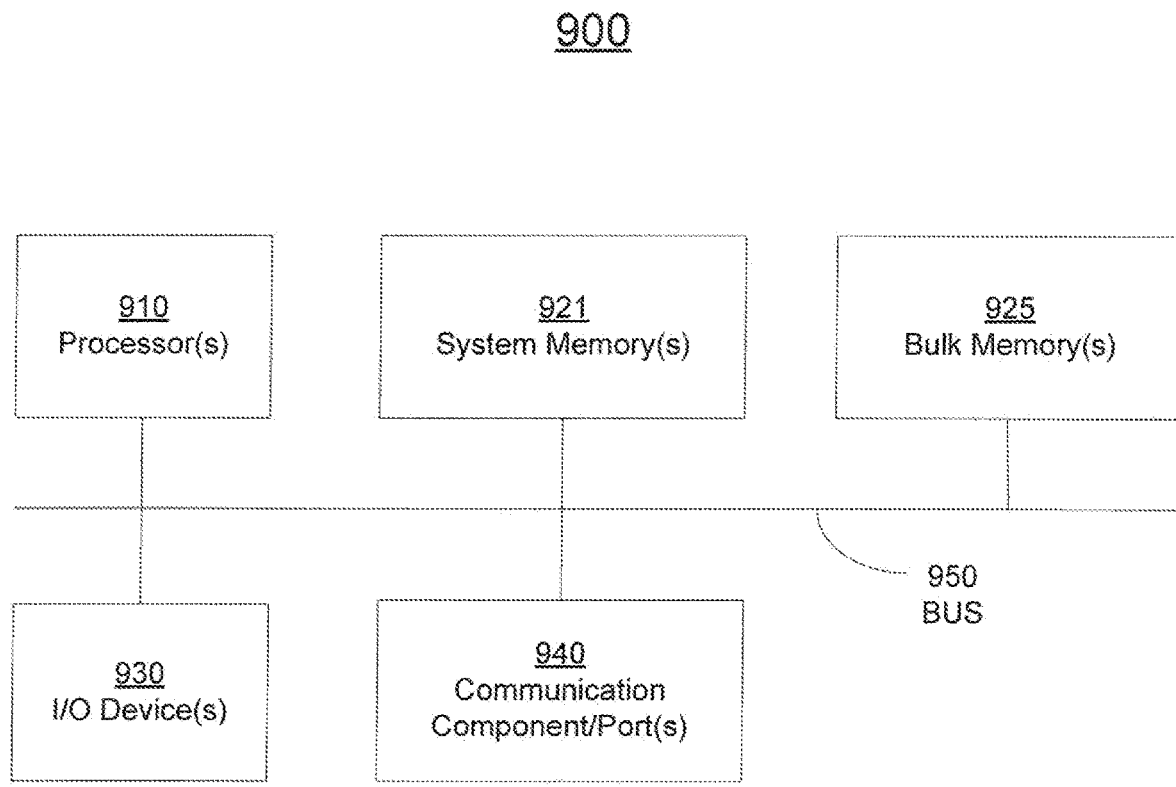
FIG. 9 is a block diagram of an exemplary electronic system which may be used as a platform to implement and control an exchange process in accordance with one embodiment.

FIG. 9 is a block diagram of an exemplary electronic system 900 which may be used as a platform to implement and control an exchange process in accordance with one embodiment. Electronic system 900 can be a "server" computer system. Electronic system 900 includes a central processor(s) 910, system memory 915, bulk memory 925 (e.g., hard drive, external memory, etc.), input/output (I/O) devices 930, communication component/port 940, and bus

950. Bus 950 is configured to communicatively couple and communicate information between the other components (e.g., central processor(s) 910, system memory 915, bulk memory 925, input/output (I/O) devices 930, communication component/port 940, etc.). Central processor(s) 910 is configured to process information and instructions. System memory 921 (e.g., reads only memory (ROM), random access memory (RAM), etc.) and bulk memory(s) 925 is configured to store information and instructions for the central processor complex 915. I/O device(s) 930 can communicate information to the system (e.g., central processor 910, memory 925, etc.). I/O devices 930 may be any suitable device for communicating information and/or commands to the electronic system (e.g., a keyboard, buttons, a joystick, a track ball, an audio transducer, a microphone, a touch sensitive digitizer panel, eyeball scanner, display component, light emitting diode (LED) display, plasma display device etc.). Communication port 940 is configured to exchange/communicate information with external devices/network (not shown). A communication port 940 can have various configurations (e.g., limitation RS-232 ports, universal asynchronous receiver transmitters (UARTs), USB ports, infrared light transceivers, ethernet ports, IEEE 13394, synchronous ports, etc.) and can communicate with an external network.

Figure 10:
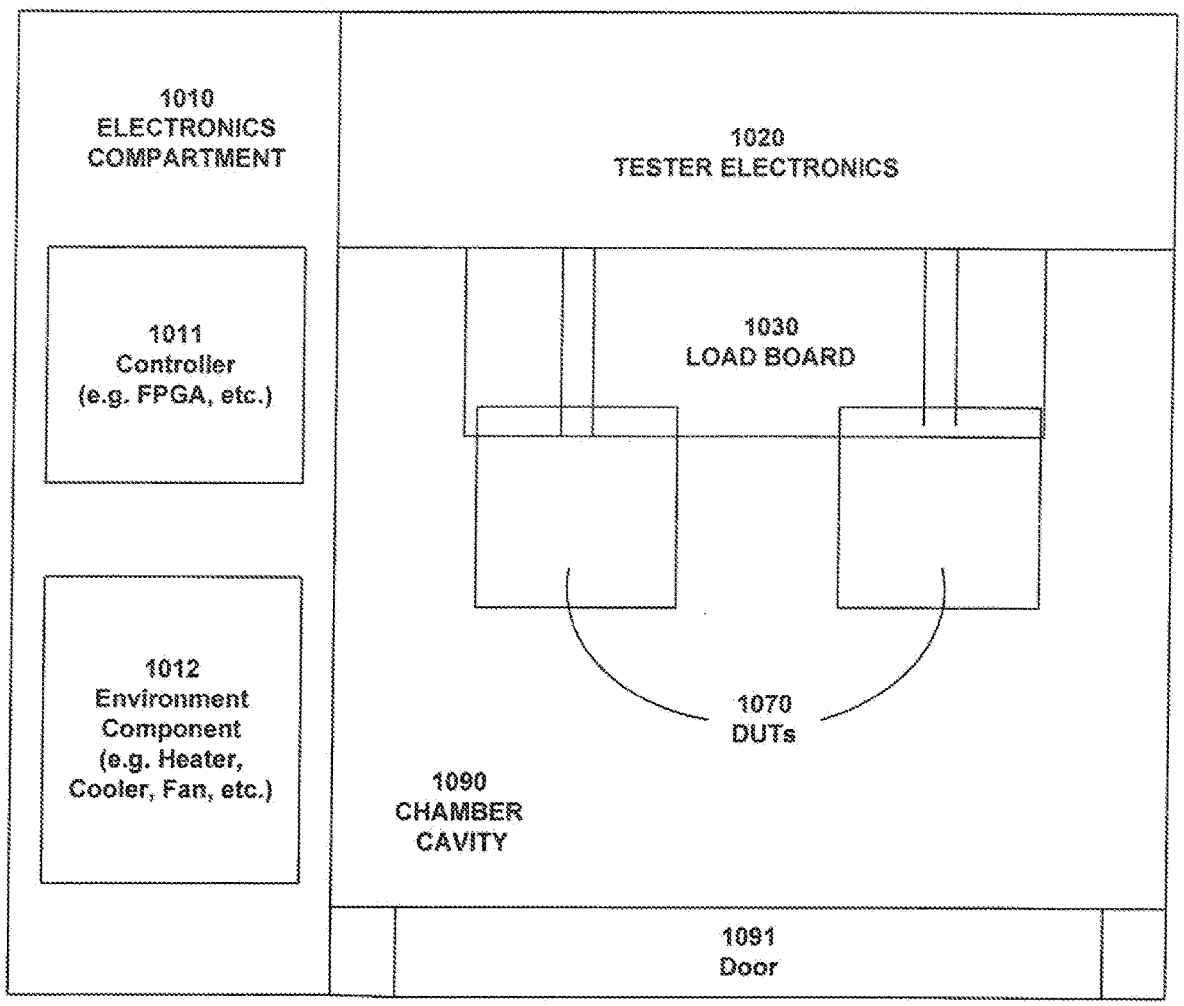
FIG. 10 is a block diagram of an exemplary testing system in accordance with one embodiment.

FIG. 10 is a block diagram of an exemplary testing system 1000 in accordance with one embodiment. Testing system 1000 includes electronics compartment 1010 and tester electronics 1020, loadboard 1030, DUTs 1070, and testing chamber 1090 with door 1091. Electronics compartment 1010 includes controller 1011 and environment component 1012. Enhanced loopback components can be inserted instead of the DUTs for diagnostic analysis (e.g., of tester electronics 1020, etc.).

Figure 11:
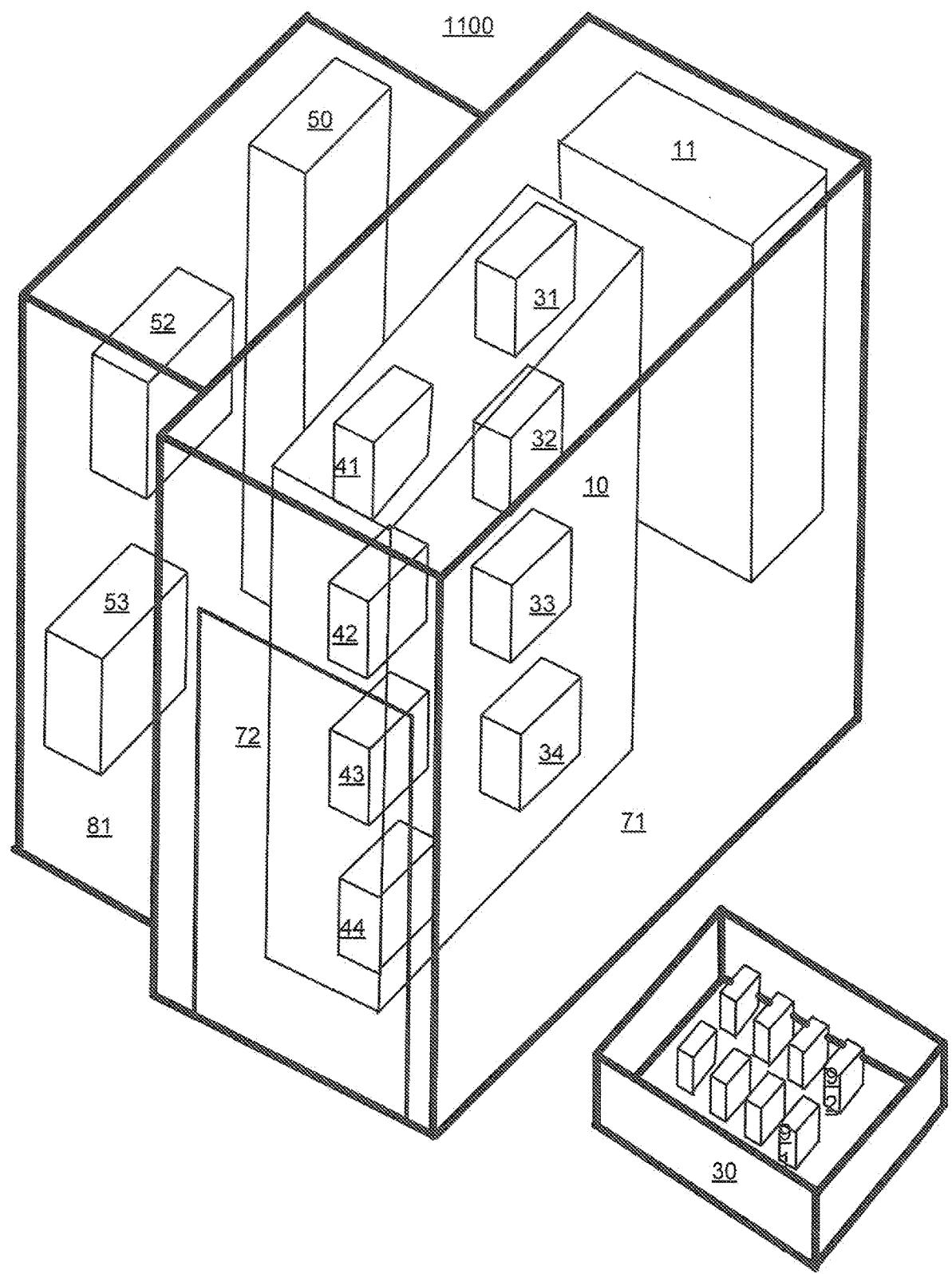
FIG. 11 is a block diagram of an exemplary testing system in accordance with one embodiment.

FIG. 11 is a block diagram of an exemplary testing system 1100 in accordance with one embodiment. It consists of a large controlled environmental chamber or oven 71 that contains an oven rack 10 and heating and cooling elements 11. The oven rack 10 contains devices under test (DUTs) in a number of loadboard trays 31, 32, 33, 34, 41, 42, 43, and 44. The environmental test chamber 71 has solid walls and a solid door 72 that enclose the test rack 15. The heating and cooling elements 11 can have a wide temperature range (e.g., −10 to 120 degrees C.). The tester or test head 81 contains various racked components, including system controller network switches 52, system power supply components 53, and tester slices 50 (the tester slice contains the tester electronics). The loadboard trays (e.g., 30, 31, etc.) are connected to tester slices 50 (multiple loadboard trays can be coupled to a single tester slice). There is also a block diagram of a tester tray 30 and devices under test (e.g., 91, 92, etc.). The loadboard trays are manually populated with devices under test. The full tester trays (e.g., 30, 31, etc.) are manually inserted into environmental chamber 71 and manually connected to the tester electronics (e.g., 50, 52, 53, etc.). This process can be labor intensive and cumbersome (e.g., the process requires opening the door 72 of the environmental chamber 71 and manually trying to insert the trays though the door 72 into the appropriate location). Enhanced loopback components can be inserted instead of the DUTs for diagnostic analysis of tester electronics.

In one embodiment, a test system includes a device interface board and tester electronics that control testing operations. The tester electronics can be located in an enclosure which together are referred to as the primitive. The device interface board has a device under test access interface that allows physical manipulation of the devices under test (e.g., manual manipulation, robotic manipulation, etc.). A device under test can be independently manipulated physically with little or no interference or impacts on testing operations of another device under test. Device interface boards and their loadboards can be conveniently setup to accommodate different device form factors. In one embodiment, loadboards are configured with device under test interfaces and universal primitive interfaces. In one exemplary implementation, the device interface board can control an ambient environment of a device under test.

Figure 12:
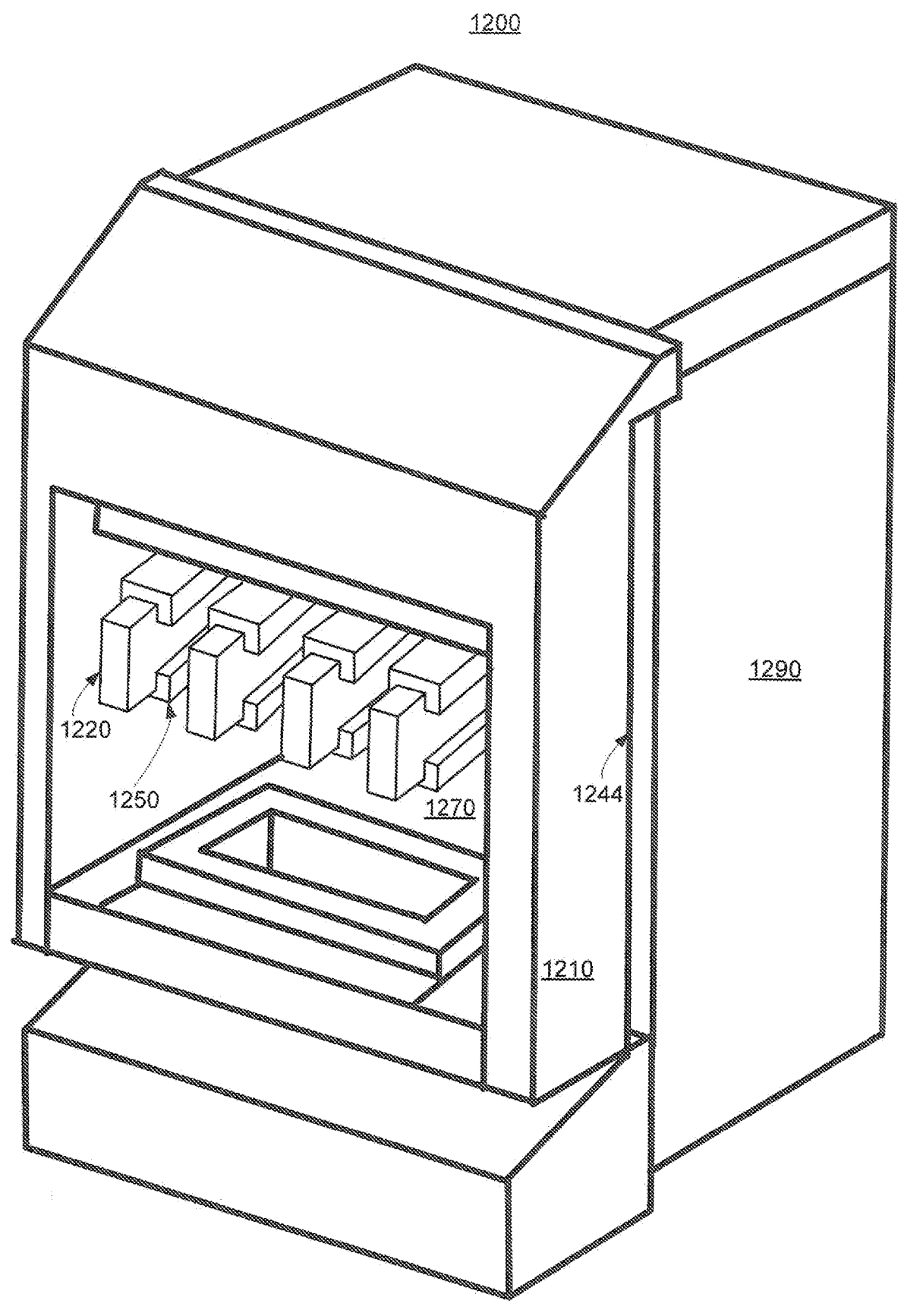
FIG. 12 is a block diagram of an exemplary test system in accordance with one embodiment.

FIG. 12 is a block diagram of an exemplary test system 1200 in accordance with one embodiment. Test system 1200 includes a testing primitive 1290 (e.g., containing the testing control hardware and power supply components for the devices under test, etc.) and a device interface board (DIB) 1210 disposed in front of and coupled to the primitive 1290. In one embodiment, the device interface board 1210 is a partial enclosure. The loadboard is also coupled to and electrically interfaces with the primitive 1290 to obtain power and high-speed electrical signals for testing the device under test 1220. The device interface board can include air flow channels 1244 that allow air flow to and from the device under test environment. The air flow channels 1244 can include baffles. The device interface board 1210 partial enclosure includes a device under test access interface 1270 that enables easy physical access (e.g., unobstructed, unimpeded, etc.) to the devices under test. Environmental control components (not shown) control and maintain device under test ambient environmental conditions (e.g., temperature, air flow rate, etc.). The environmental control components can create an environmental envelope that prevents or mitigate interference from outside environmental conditions on the operations of devices under test. Enhanced loopback components can be inserted instead of the DUTs for diagnostic analysis of tester electronics (e.g., in primitive 1290, etc.).

While the invention has been described in conjunction with the preferred embodiments, it will be understood that they are not intended to limit the invention to these embodiments. On the contrary, the invention is intended to cover alternatives, modifications, and equivalents. The description is not intended to be exhaustive or to limit the invention to the precise forms disclosed, and obviously many modifications and variations are possible.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like. It should be borne in mind, however, that all of these and similar terms are associated with the appropriate physical quantities and are merely convenient labels applied to these quantities. Unless specifically stated otherwise as apparent from the discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the description includes exemplary concepts or embodiments associated with the novel approach. It is also appreciated that the listing is not exhaustive and does not necessarily include all possible implementation. The concepts and embodiments can be implemented in hardware, firmware, software, and so on. In one embodiment, the methods or process describe operations performed by various processing components or units. In one exemplary implementation, instructions, or directions associated with the methods, processes, operations etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the Claims.

The invention claimed is:

1. A test system comprising:
   a user interface configured to enable user interaction with the system;
   a test board configured to communicatively couple with a plurality of devices under test (DUTs), wherein the DUTs are compute express link (CXL) protocol compliant; and
   a tester configured to perform direct testing of the plurality of DUTs, wherein the tester comprises a direct access device (DAX) component that prevents corruption of DUTs, wherein the direct access device (DAX) component creates a unique DAX instance for each individual DUT included in the plurality of DUTs.

2. The test system of claim 1, wherein the tester isolates testing of a particular CXL enabled DUT from undesirable interference and corruption.

3. The test system of claim 1, wherein the tester prevents inappropriate writing over a DUT's memory.

4. The test system of claim 1, wherein the DUTs reside in a separate per-device memory space of a Linux operating system rather than extension of memory space.

5. The test system of claim 1, wherein one of the plurality of DUTs is a CXL type 3 memory expander device.

6. A device testing management method comprising:
   performing a persistent device representation process for a compute express link (CXL) protocol compliant device under test (DUT), wherein the persistent device representation process comprises naming the DUT with a name, wherein the name is created automatically on top of a LINUX enumeration and wherein further the DUT resides in a separate per device space of a direct access device (DAX) memory interface:
   performing a device power up cleanup process; and
   performing a device power down cleanup process.

7. The device testing management test method of claim 6, wherein the performing a persistent device representation process comprises assigning and tracking the CXL compliant DUT, including characteristics of the CXL compliant DUT, based upon a reference indicator that is unique to the CXL compliant DUT, wherein the reference indicator is persistent while the CXL compliant DUT is communicatively coupled to a test board.

8. The device testing management method of claim 7, wherein the reference indicator is based upon a test board location slot utilized to communicatively couple the CXL compliant DUT.

9. The device testing management method of claim 6, wherein a test board location based name ensures a tester is able to target the CXL compliant DUT and is persistent while the CXL compliant DUT is communicatively coupled to the-a load board.

10. The device testing management method of claim 6, wherein the device power down clean up process comprises a flushing process for a central processing unit (CPU) and cache included in a host in a tester.

11. The device testing management method of claim 10, where the flushing process comprises flushing data in addresses that were written to in operations associated with testing of the CXL compliant DUT, wherein the addresses are included in a range mapped to the CXL compliant DUT.

12. The device testing management method of claim 6, wherein the device power up cleanup process comprises waiting for a BIOS enumeration process without scanning device.

13. A test system comprising:
   a user interface configured to enable user interaction with the system;
   a test board configured to communicatively couple with a compute express link (CXL) protocol compliant device under test (DUT); and
   a tester configured to perform direct testing of the CXL compliant DUT, wherein the tester assigns and tracks the CXL compliant DUT, including characteristics of the CXL compliant DUT, based upon a reference indicator that is unique to the CXL compliant DUT, and wherein further the reference indicator is persistent while the CXL compliant DUT is communicatively coupled to the test board.

14. The test system of claim 13, wherein the reference indicator is based upon a test board location.

15. The test system of claim 14, wherein the test board location is a slot included in the test board and wherein the CXL compliant DUT is communicatively coupled to the test board via the slot.

16. The test system of claim 13, wherein the tester assigns and tracks the CXL compliant DUT via a reference indicator in a device space.

17. The test system of claim 13, wherein the reference indicator is a DAX device representation.

18. The test system of claim 13, wherein the tester isolates testing of a particular CXL compliant DUT from undesirable interference and corruption.

\* \* \* \* \*